US006317743B1

United States Patent
Heck

(12) United States Patent
(10) Patent No.: US 6,317,743 B1
(45) Date of Patent: Nov. 13, 2001

(54) SYSTEM FOR RETRIEVING COMPILING AND LOADING MANAGEMENT INFORMATION IN A DIGITAL DATA NETWORK

(75) Inventor: Joachim R. Heck, Winchester, MA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/206,094

(22) Filed: Dec. 4, 1998

(51) Int. Cl.[7] ................................................... G06F 17/30
(52) U.S. Cl. ................................ 707/10; 707/3; 707/4; 707/200; 709/273
(58) Field of Search .............................. 709/223; 707/4, 707/3, 10, 200

(56) References Cited

U.S. PATENT DOCUMENTS

| 5,850,511 | * | 12/1998 | Stoecker et al. | 714/32 |
| 5,960,176 | * | 9/1999 | Kuroki et al. | 709/223 |
| 6,018,770 | * | 1/2000 | Little et al. | 709/223 |
| 6,167,448 | * | 12/2000 | Hemphill et al. | 709/224 |
| 6,226,679 | * | 5/2001 | Gupta | 709/230 |
| 6,240,457 | * | 5/2001 | Bell | 709/230 |

OTHER PUBLICATIONS

Deri, Luca, "Surfin' Network Resources Across the Web",. Proceedings of The Second International Workshop on Systems Management, Jun. 19–21, 1996, pp. 158–167.*

Kim et al., "An Architecture of Internetworking System For Different Management Networks", Network Operations and Management Symposium, 1998, NOMS 98, Feb. 15–20, 1998, IEEE vol. 1, p. 60–69.*

* cited by examiner

Primary Examiner—Paul R. Lintz
(74) Attorney, Agent, or Firm—Bromberg & Sunstein LLP

(57) ABSTRACT

A management information loader is used in connection with a management information server, the management information server using management information in connection with performing least one management operation in connection with a network comprising a plurality of interconnected devices. The management information loader comprises an operator interface module, a plurality of compilers and a control module. The operator interface module enables an operator to provide a management information file identification identifying at least one management information file containing management information to be used by the management information server. Each of the compilers facilitates conversion of files containing management information from a respective format to a common format. The control module receives the management information file identifications as provided by the operator from the operator interface module and retrieves the management information files identified by the respective management information file identifications from their respective current storage location on the network. IN addition, for each management information file, the control module enables the compiler that is appropriate to the respective file's format to perform any necessary conversion of the retrieved management information file from its current format to the common format, and loads management information from the management information file, as in the common format, into a working memory in the management information server.

21 Claims, 6 Drawing Sheets

SYSTEM FOR RETRIEVING COMPILING AND LOADING MANAGEMENT INFORMATION IN A DIGITAL DATA NETWORK

FIELD OF THE INVENTION

The invention relates generally to the field of digital data networks, and more particularly to systems and methods for facilitating the efficient retrieval of network management information from various locations in the network to a single location that serves as a management information server, conversion of the information into a common or useable format and loading of the converted information into the management information server's working memory for use in connection with selected management operations.

BACKGROUND OF THE INVENTION

In modem "enterprise" digital data processing systems, that is, computer systems for use in an office environment in a company, a number of personal computers, workstations, and other devices such as mass storage subsystems, network printers and interfaces to the public telephony system, are typically interconnected in a computer network. The personal computers and workstations (generally, "computers") are used by individual users to perform processing in connection with data and programs that may be stored in the network mass storage subsystems. In such an arrangement, the computers, operating as clients, access the data and programs from the network mass storage subsystems for processing. In addition, the computers will enable processed data to be uploaded to the network mass storage subsystems for storage, to a network printer for printing, to the telephony interface for transmission over the public telephony system, or the like. In such an arrangement, the network mass storage subsystems, network printers and telephony interface operate as servers, since they are available to service requests from all of the clients in the network. By organizing the network in such a manner, the servers are readily available for use by all of the computers the network. Such a network may be spread over a fairly wide area, with the computers being interconnected by communication links such as electrical wires or optic fibers.

Typically in a network, information that a network administrator or other manager may need in order to manage the network is distributed over a number of computers in the network and may be in a number of schemas and formats. To provide a central location for the management information, a network administrator will to retrieve the files containing the management information from the disparate locations throughout the network at which they are located and copy them to a management information server, and convert them to a standard schema and format. Currently, each of these operations is handled separately, with the network administrator using separate tools to copy the files to the management information server, compilers to perform the file conversion, and loaders to load the management information from the converted files into the management information server's working memory. A problem can develop in that use of these diverse tools can lead be complex and prone to error.

SUMMARY OF THE INVENTION

The invention provides a new and improved system and method for facilitating the efficient retrieval of network management information from various locations in the network to a single location that serves as a management information server, conversion of the information into a common or useable format and loading of the converted information into the management information server's working memory for use in connection with selected management operations.

In brief summary, a management information loader in accordance with the invention is used in connection with a management information server, the management information server using management information in connection with performing least one management operation in connection with a network comprising a plurality of interconnected devices. The management information loader comprises an operator interface module, a plurality of compilers and a control module. The operator interface module enables an operator to provide a management information file identification identifying at least one management information file containing management information to be used by the management information server. Each of the compilers facilitates conversion of files containing management information from a respective format to a common format. The control module receives the management information file identifications as provided by the operator from the operator interface module and retrieves the management information files identified by the respective management information file identifications from their respective current storage location on the network. IN addition, for each management information file, the control module enables the compiler that is appropriate to the respective file's format to perform any necessary conversion of the retrieved management information file from its current format to the common format, and loads management information from the management information file, as in the common format, into a working memory in the management information server.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
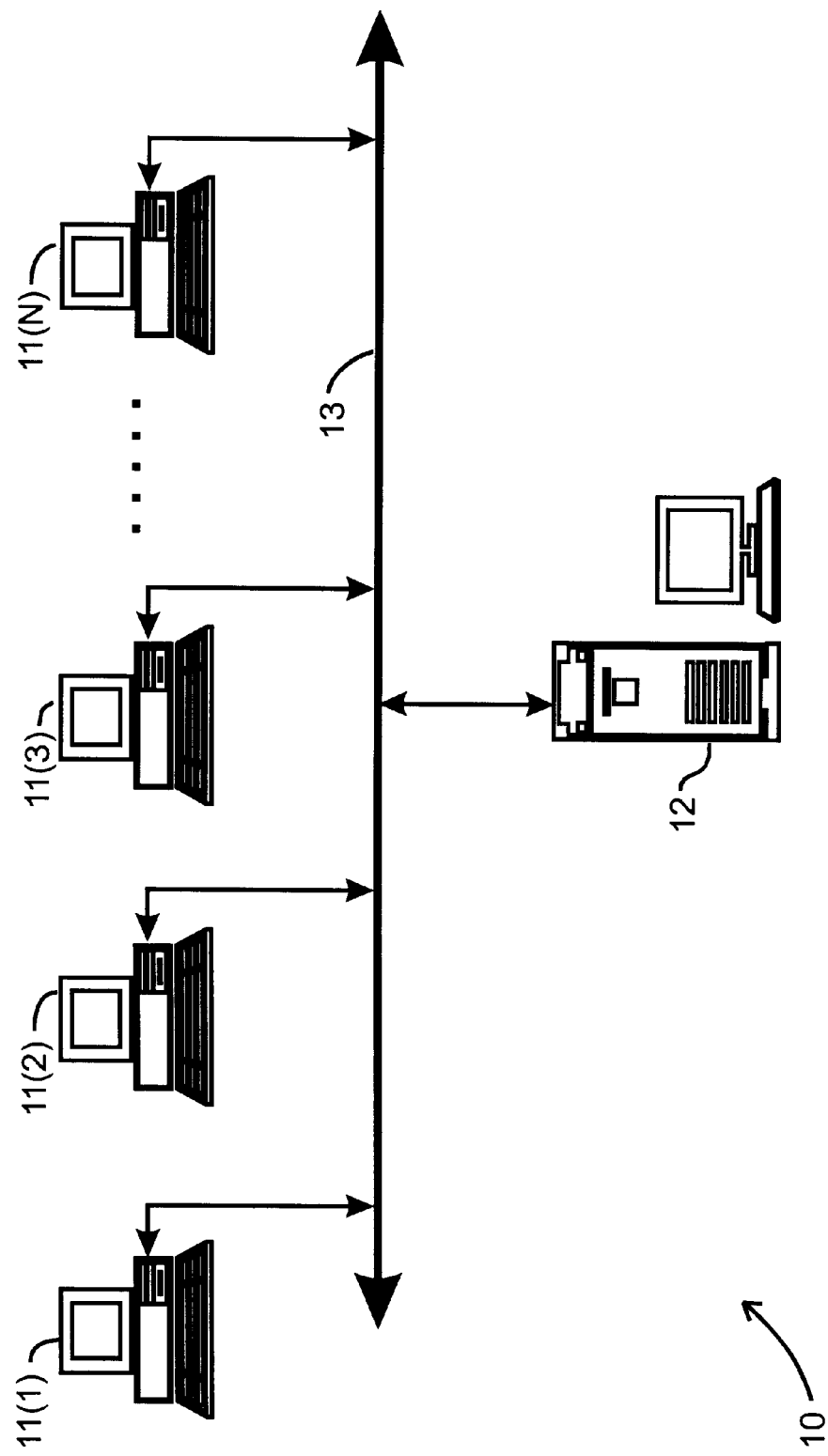
FIG. 1 is a schematic diagram of a computer network including a computer constructed in accordance with the invention.

FIG. 1 depicts a computer network 10 including an arrangement, termed a "management information loader," for use in connection with a management information server in the network, which management information loader facilitates the efficient retrieval of files containing management information from disparate locations on the network, compilation or otherwise converting of the files to a common format and loading of management information from the converted files into working memory of the management information server, constructed in accordance with the invention. With reference to FIG. 1, network 10 includes a plurality of computers 11(1) through 11(N) (generally identified by reference numeral 11(n)) and 12 which are interconnected by a communication link 13. As is conventional, the computers 11(n) and 12 are of the conventional stored-program computer architecture. At least some of the computers 11(n) are in the form of personal computers or computer workstations, each of which includes a system unit, a video display unit and operator input devices such as a keyboard and mouse. The computer 12 also includes a system unit, and may also include a video display unit and operator input devices. A system unit generally includes processing, memory, mass storage devices such as disk and/or tape storage elements and other elements (not separately shown), including network interface elements for interfacing the respective computer system 11(n) or server computer 12 to the communication link 13. A video display unit permits the computer to display processed data and processing status to the user, and an operator input device enable the user to input data and control processing by the computer. The computers 11(n) and 12 transfer information, in the form of messages, through their respective network interface devices among each other over the communication link 13. The communication link 13 interconnecting the client computers 11(n) and server computer 12 in the network 10 may, as is conventional, comprise wires, optical fibers or other media for carrying signals representing information among the computers 11(n) and 12.

In one embodiment, the network 10 is organized in a "client-server" configuration, in which at least one computer, namely, computer 12, operates as a server, and the other computers 11(n) operate as clients. Typically, the servers include large-capacity mass storage devices which can store copies of programs and data which are available for retrieval by the client computers over the communication link 13 for use in their processing operations. From time to time, a client computer system 11(n) may also store data on the server computer 12, which may be later retrieved by it (the client computer that stored the data) or other client computers for use in their processing operations. The server computers may be generally similar to the client computers 11(n), including a system unit, video display unit and operator input devices and may be usable by an operator for data processing operations in a manner similar to a client computer. Alternatively, at least some of the server computers may include only processing, memory, mass storage and network interface elements for receiving and processing retrieval or storage requests from the client computers, and generating responses thereto.

Figure 2:
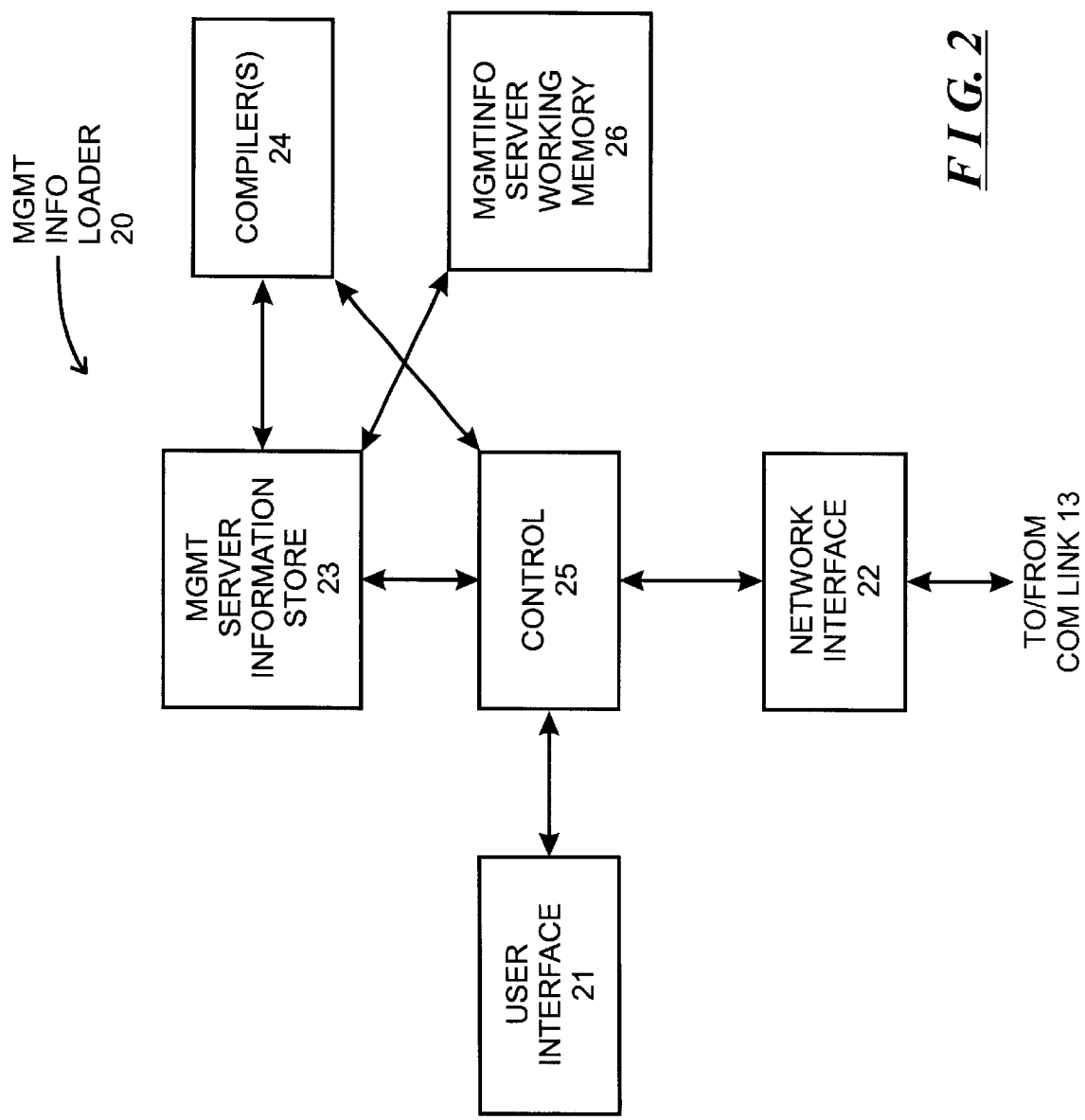
FIG. 2 is a functional block diagram of a computer useful in the network depicted in FIG. 1 including an arrangement for facilitating the efficient retrieval of network management information from various locations in the network to a single location that serves as a management information server, conversion of the information into a common or useable format and loading of the converted information into the management information server's working memory for use in connection with selected management operations.

The invention provides an arrangement, which will be termed a management information loader, for facilitating the retrieval of files containing management information which is useful to, for example, a network administrator or other manager, in managing the network, from disparate computers, such as computers 11(n), and other devices which may be connected to the network, for storage on a management information server, comprising, for example, server computer 12, for compiling and otherwise converting the files to a common format and for loading management information from the files into the management information server's working memory for use or processing under control of the network administrator. An functional block diagram of a management information loader, identified by reference numeral 20, is depicted in FIG. 2. With reference to FIG. 2, the management information loader 20 includes a user interface 21, network interface 22, management server information store 23, and one or more compilers 24 all under control of a control module 25. As noted above, the management information loader 20 operates in connection with the management information server, which also includes a working memory 26. In addition, the management information server also includes an operating system (not separately shown) and may also include other programs (also not separately shown) for using information that is in the working memory 26 to, inter alia, manage various operational aspects of the network, as will be apparent to those skilled in the art. Further, the user interface 21, network interface 22 and management information server store 23 may also be used by those other programs.

Generally, the user interface 21, under control of the control module 25, displays information to an operator and receives information from the operator, and in that connection includes the video display unit and operator input device(s) as described above. In one embodiment, in which the user interface 21 provides a graphical user interface, it (that is, the user interface 21) displays information in one or more windows. For the management information loader 20, the user interface 21 displays a window having a plurality of panes, including a file list pane and a status pane, as well as several control pushbuttons. In the file list pane, the user interface 21 provides a list of files which are stored in computers and other devices in the network 10 which contain network management information which may be retrieved using the management information loader 20. The list of files displayed in the file list pane may be input by the operator of the management information server directly to the management information server, or it may be provided by operators of the other computers 11(n) in the network. Alternatively, the list of files which contain management information may be obtained by the management information loader 20 by browsing the network in a conventional manner, possibly under control of the operator of the management information server or another computer 11(n). In one particular embodiment, one of the control pushbuttons provided in the management information loader's window is a "Browse" pushbutton, which enables the magement information loader 20 to perform a browse operation, in a conventional manner, to determine the identification of files containing management information that the operator may wish to have compiled, translated or otherwise converted to the common format and loaded into the management information server's working memory. As will be described below in greater detail, the operator, using a keyboard or mouse, may select ones of the files which are listed in the file list pane and, by actuating an appropriate control push button, enable the management information loader 20 to compile, translate or otherwise convert the file to the common format.

The network interface 22 connects to the communication link 13 and, under control of the control module 25, transmits information in the form of messages over the communication link 13 for transmission to computers 11(n) and other devices connected in the network 10. In addition, the network interface 22 receives information, including files containing management information, in the form of messages from computers 11(n) and other devices connected in the network 10. If the management information loader 20 uses a browsing operation to obtain the list of files, the browsing operation will generally include the transfer of messages to and from the network interface 22 over the communication link 13. Similarly, when the management information loader 20 retrieves the management information files from disparate locations over the network 10, the management information file retrieval operation will generally include the transfer of messages to and from the network interface 22 over the communication link 13.

The management information server store 23 provides storage for information in the management information server, and thus can include components such as memory and mass storage devices which may be provided in the management information server. In connection with the management information loader 20, the management information server store 23 provides storage for the management information file list which may be generated by or for the management information loader 20, as well as for the management information files retrieved by the management information server and files containing compiled or translated management information.

The compiler(s) 24 are provided to, under control of the control module 25, compile, translate or otherwise convert files selected by the operator from their respective formats as retrieved from the disparate computers 11(n) and other devices in the network, to the common format which can be loaded into the management information server working memory 26 for use or processing under control of the network administrator. In one embodiment, the management information files can be in several formats, including SNMP (Simple Network Management Protocol) schema format, SNMP MIB (Management Information Base) format, or GDMO (Guidelines for the Definition of Managed Objects) format, and the common format is selected to be the GDMO format. In that case, compilers are provided to convert those files that are in SNMP schema format or MIB format to GDMO format. Each compiler, after it performs the appropriate file compilation or translation, can store the resulting converted file in the management information server information store 23 and notify the control module 25 when the operation has been completed.

As noted above, the control module 25 controls the other components of the management information loader 20 to facilitate display by the user interface 21 of management information loader's window and the list of management information files which can be retrieved. The control module 25 also receives from the user interface 21 the identification of the management information files which have been selected by the operator. After receiving the identification of management information files selected by the operator, the control module 25 will enable the network interface 22 to retrieve them (that is, the selected management information files) and store them in the management information server information store 23. After respective files have been retrieved, the control module 25, if necessary, also invokes the appropriate one of the compilers 24 to compile, translate or otherwise convert the file to the common format, and store the converted file in the management information server information store 23. In one embodiment, each management information file includes, in its file name, an indication of its respective format. Illustratively, a management information file in the SNMP schema format will have at least some portion of the string "SNMP" in its file name, a management information file in the MIB format will have at least some portion of the string "MIB" in its file name, and a management information file in the GDMO format will have at least some portion of the string "GDMO" in its file name. Thus, the control module 25 can determine which one of the compilers 24 to invoke for a particular management information file by reference to the file name for the management information file for which the respective compiler is to be invoked. In any case, after the compiler has finished and stored the converted file in the management information server information store 23, the control module 25 can enable information from the converted management information file to be loaded into the management information server working memory 26 for use by the operator. In addition, when these operations is performed, the control module 25 can enable the user interface 21 to display status information indicating the status of the respective operations.

The control module 25 can perform each of the above-described operations for each of the management information files selected by the operator. After the operator has finished, he or she can, by actuation of, for example, an appropriate pushbutton in the management information server's window, enable the management information loader 20 to terminate operations and the management information loader's window to be removed from the video display unit.

Figure 3:
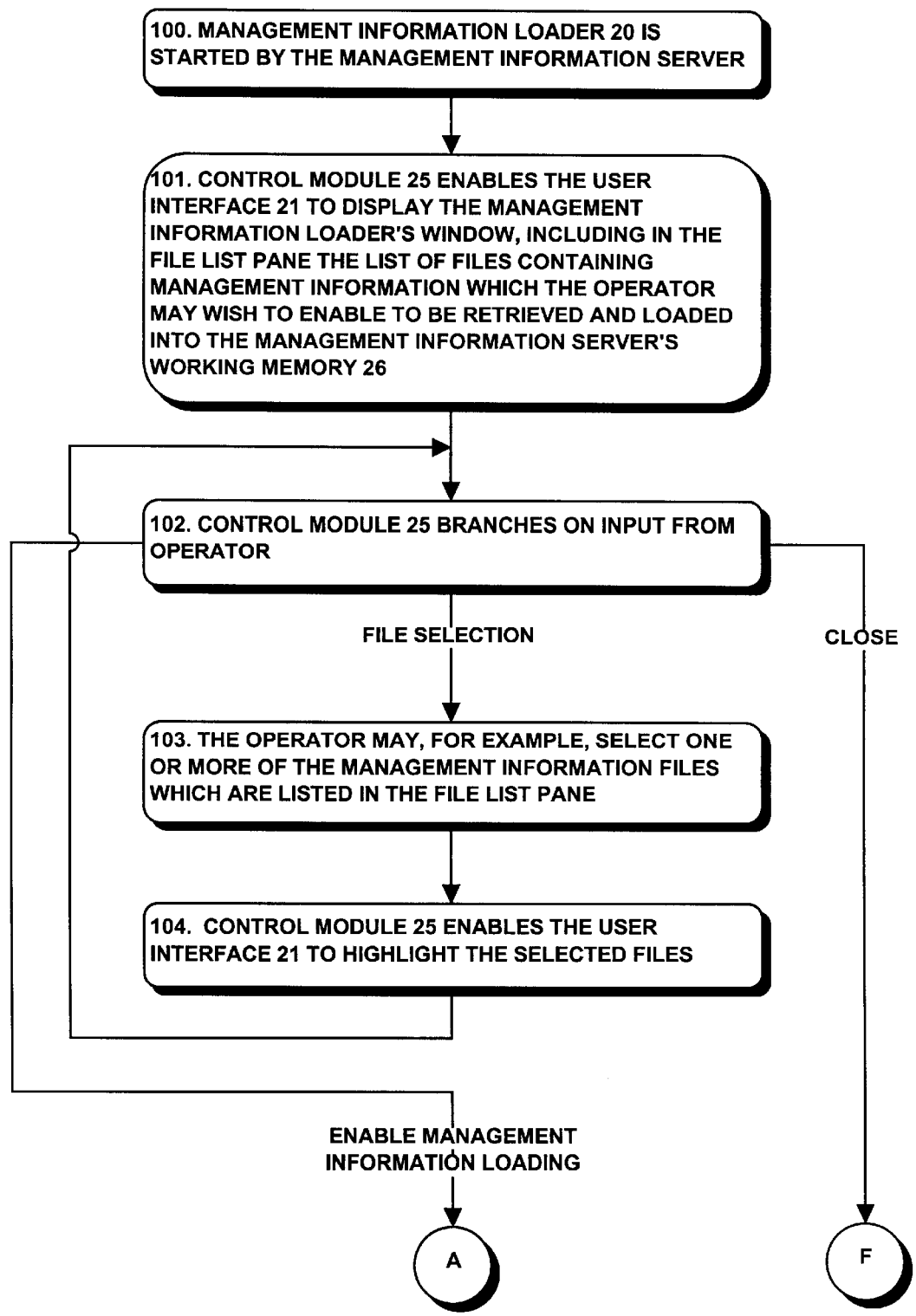
FIG. 3 is a flowchart depicting operations performed by the arrangement depicted in FIG. 2.
Figure 3A:
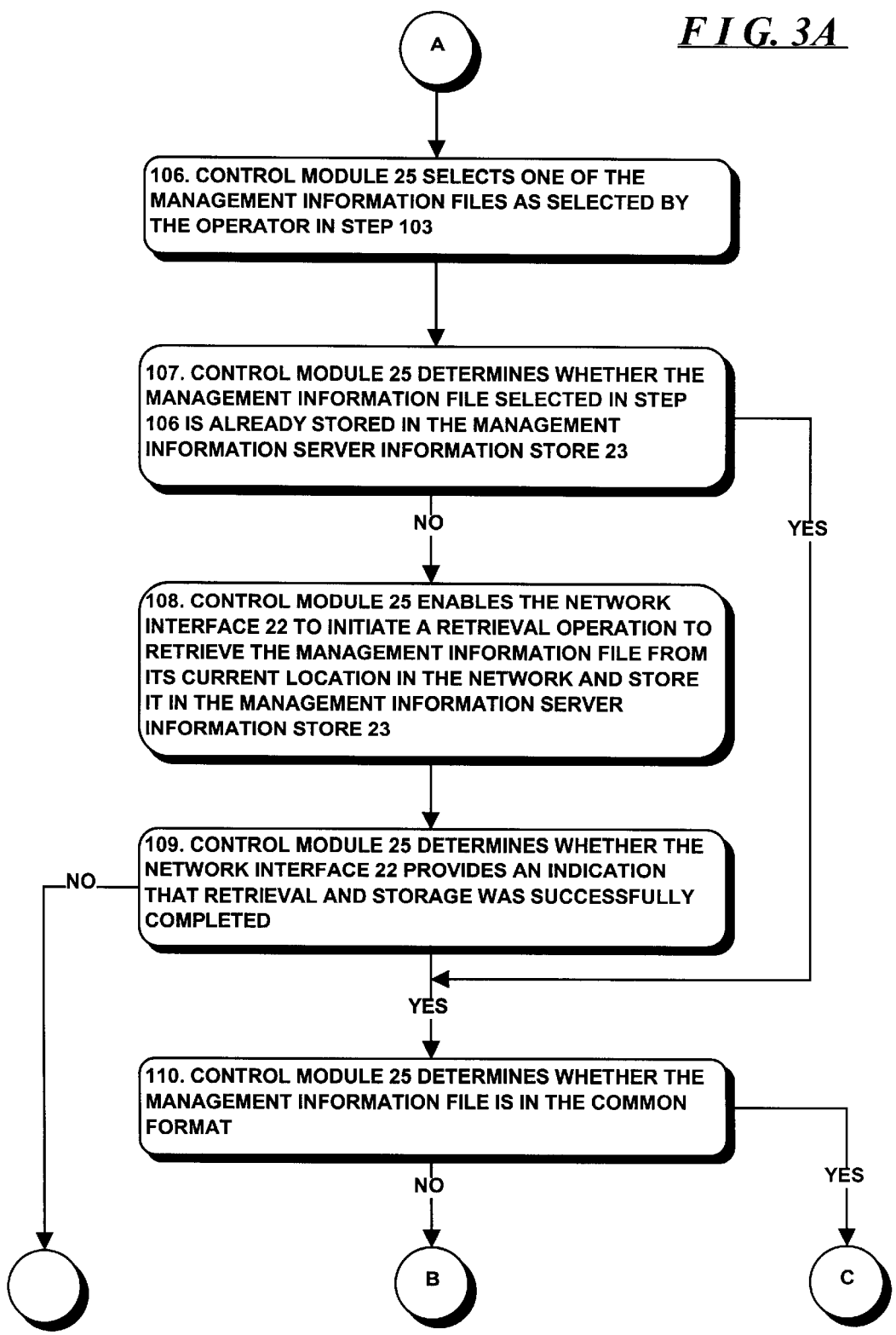
Figure 3B:
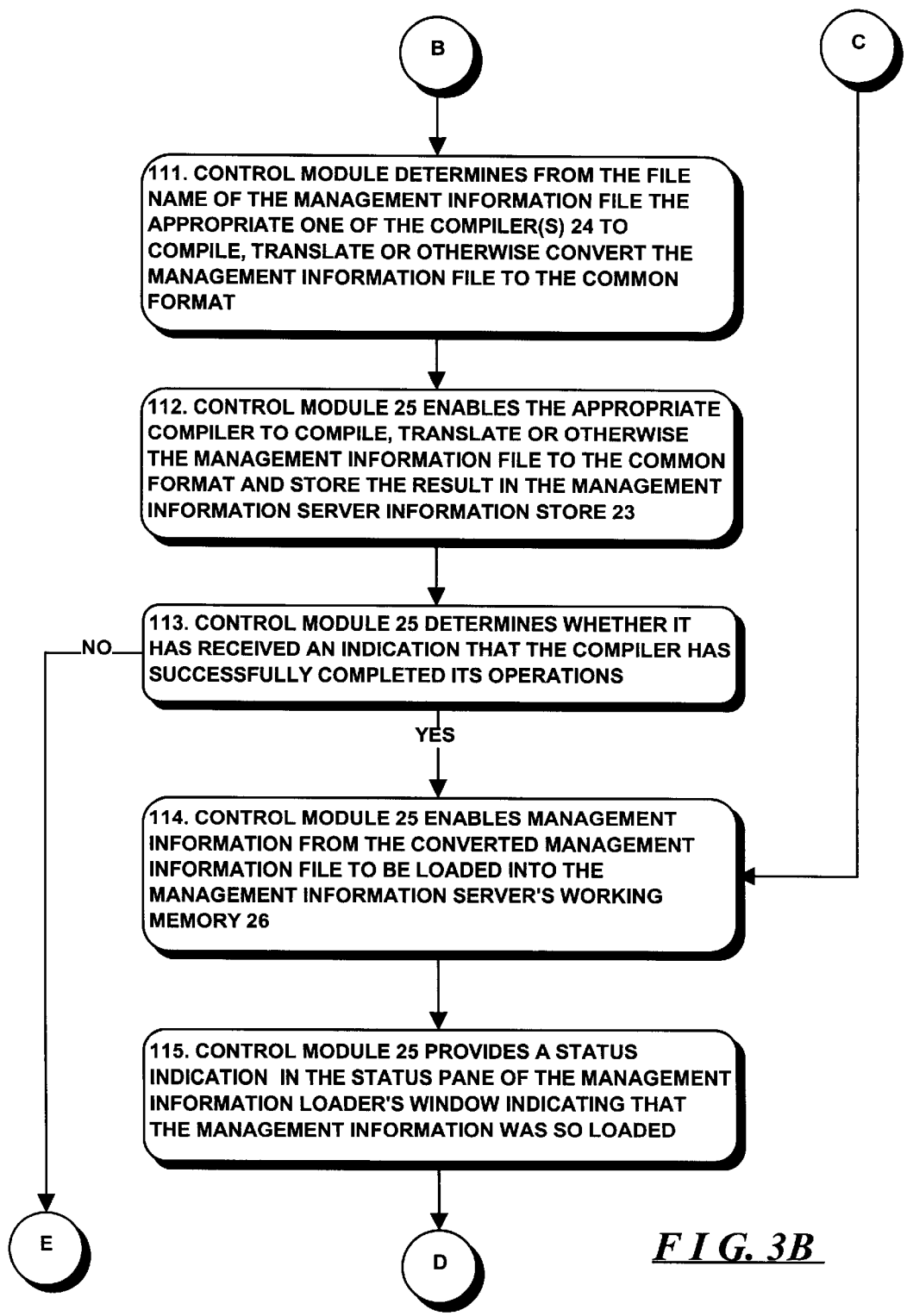
Figure 3C:
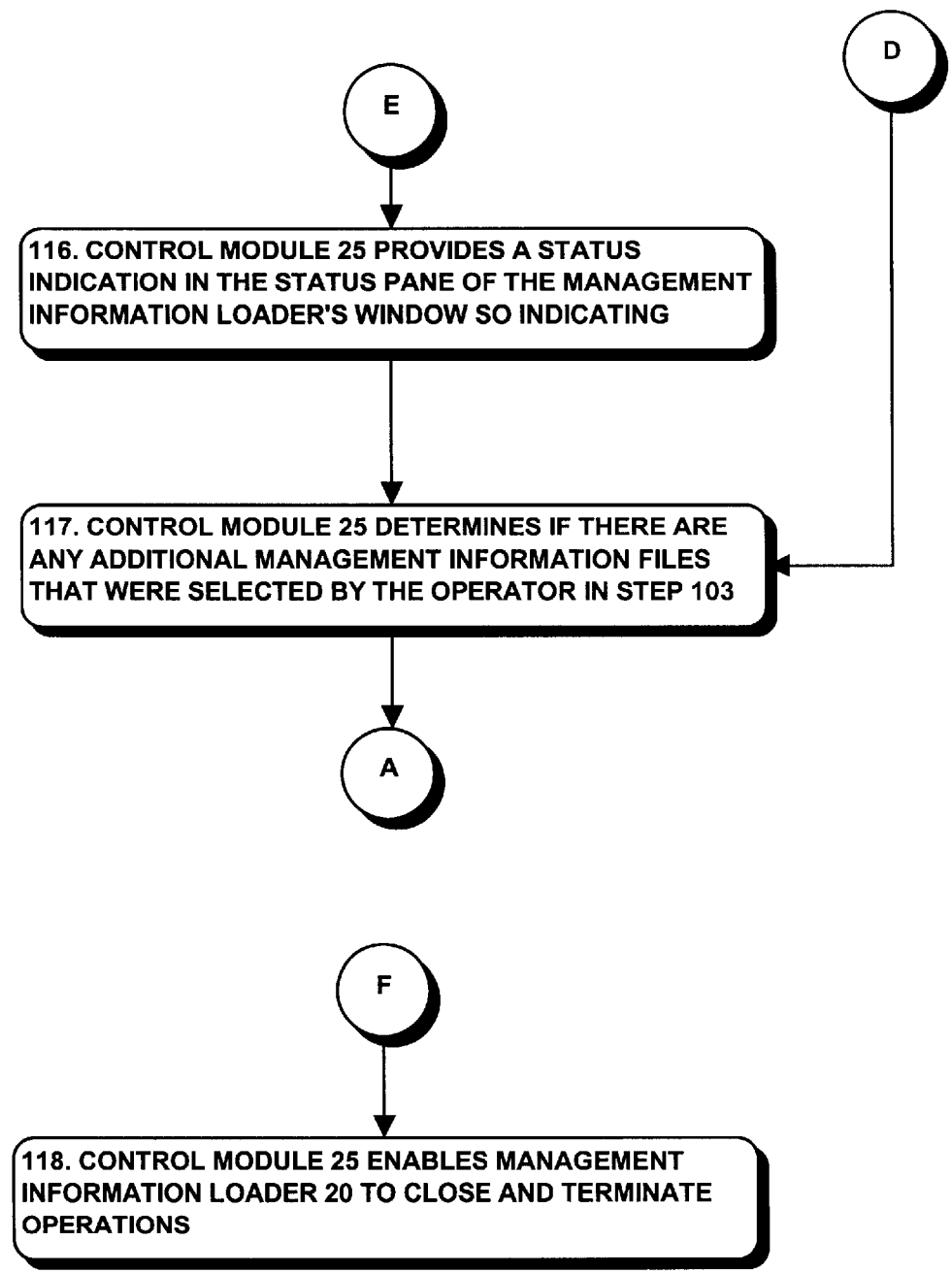

Detailed operations performed by the control module 25 will be described in connection with the flowchart depicted in FIG. 3. With reference to FIG. 3, after the management information loader 20 has been started up by the management information server (step 100), the control module 25 enables the user interface 21 to display the management information loader's window, including in the file list pane the list of files containing management information which the operator may wish to enable to be retrieved and loaded into the management information server's working memory 26 (step 101). In addition, the control module 25 may enable the operator, through the user interface 21, to initiate a browse operation to locate management information files which may be stored on various computers 11(n) and other devices connected in the network and display the filenames and locations of management information files which may have been located in the file list pane. After the management information file list has been displayed in the file list pane of the management information loader's window, operations enabled by the control module 25 will depend on input provided by the operator using the operator input devices, illustratively a mouse, provided by the user interface 21 (step 102). The operator may, for example, select one or more of the management information files which are listed in the file list pane (step 103), in which case the control module 25 will enable the user interface 21 to highlight the selected files (step 104).

After names of one or more management information files identified in the file name pane have been selected in step 104, if the control module determines in step 102 that the operator has actuated an appropriate push button provided in the management information loader's window, it (that is, the control module 25) will perform, in one or more iterations each for one of the management information files as selected by the operator, a number of steps to enable each of the selected files to be retrieved, compiled, translated or otherwise converted as necessary and loaded into the management information server's working memory 26. In each iteration, the control module 25 will select one of the management information files as selected by the operator (step 106) and determine whether the management information file which it (the control module 25) selected in step 106 is already stored in the management information server information store 23 (step 107). If the control module 25 makes a negative determination in step 107, that is, if it determines that the management information file is not already stored in the management information server information store 23, it (that is, the control module 25) enables the network interface 22 to initiate a retrieval operation to retrieve the management information file from its current location in the network and store it in the management information server information store 23 (step 108).

Following step 108, if the network interface 22 provides an indication that it is successful in that step (step 109), or following step 107 if the control module 25 makes a positive determination in that step (which will occur if the control module 25 determines in step 107 that the management information file is already stored in the management information server information store 23), the control module 25 will determine whether the management information file is in the common format (step 110). If the control module makes a negative determination in step 110, it will determine from the file name of the management information file the appropriate one of the compiler(s) 24 to compile, translate or otherwise convert the management information file to the common format (step 111) and enable the appropriate compiler to compile, translate or otherwise the management information file to the common format and store the result in the management information server information store 23 (step 112). If the control module 25 receives an indication that the compiler has successfully completed its operations (step 113), the control module 25 can enable management information from the converted management information file to be loaded into the management information server's working memory 26 (step 114). In addition, the control module 25 can provide a status indication in the status pane of the management information loader's window indicating that the management information was so loaded(step 115).

Returning to step 109, if the network interface 22 provides an indication in that step that it was unsuccessful in retrieving the management information file or loading it into the management information server information store 23, or if, in step 113, the compiler provides an indication that it was unable to compile, translate or otherwise convert the management information file to the common format and store it in the management information server information store 23, the control module 25 can also provide a status indication in the status pane of the management information loader's window so indicating (step 116).

Following step 115 or step 116, the control module 25 will determine if there are any additional management information files that were selected by the operator in step 103 and, if so, return to step 106 to perform steps 106 through 116 in connection with another such file (step 117). The control module 25 will perform steps 106 through 117 in connection with each of the management information files selected by the operator in step 103 until it determines in step 117 that all such files have been processed, at which point it can return to step 102 to wait for additional input from the operator.

Returning to step 102, the management information loader's window can also provide additional push buttons which are conventional and which may be actuated by the operator. For example, the window may include a "close" pushbutton which, if actuated, can enable the management information loader 20 to close and terminate operations (step 118). Other push buttons which may be provided, and functions performed by the control module 25 will be apparent to those skilled in the art.

The management information loader provides a number of advantages. In particular, it provides an arrangement for facilitating the retrieval of files containing management information which may be useful in managing operations over a network from disparate locations on the network to a common management information server, the compilation, translation or otherwise conversion of the files to a common format and the loading of information from the converted files into the management information server's working memory 26, without requiring an operator to perform each of these operations manually, which can lead to error.

It will be appreciated that numerous modifications may be made to the management information loader 20 as described herein. For example, although the management information loader has been described in connection with three particular formats, in particular the SNMP schema, MIB and GDMO formats, it will be appreciated that the management information loader may be used in connection with other formats, and appropriate compilers be provided therefor in compiler (s) 24. In addition, although the common format used for management information loader 20 has been selected to be the GDMO format, it will be appreciated that any format may be used as the common format.

In addition, although the management information loader 20 has been described in connection with use of a graphical user interface 22 in which is information is displayed in the form of a window, it will be appreciated that the user interface 22 may instead, or in addition, provide a command line interface in which the operator invokes the management information loader by typing a command on a command line, along with the name of a file containing management information, the file name including the identification of the location of the file in the network 10. In that case, the management information loader 20 will perform the operations described above in connection with 106 through 116 in connection with the file identified on the command line.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A management information loader for use in connection with a management information server, the management information server using management information in connection with performing at least one management operation in connection with a network, the network comprising a plurality of interconnected devices, said management information loader comprising:

A. an operator interface module configured to enable an operator to provide a management information file identification identifying at least one management information file containing management information to be used by the management information server;

B. at least one compiler configured to convert at least one file from a current format to a common format; and C. a control module configured to receive the management information file identification from the operator interface module, retrieve the management information file identified by the management information file identification from a current storage location, control enabling the at least one compiler to facilitate any necessary conversion of the retrieved management information file from the current format to the common format, and load management information from the management information file in the common format into a working memory in the management information server.

2. A management information loader as defined in claim 1 in which the management information file identified by the management information file identification is stored in a storage location provided by the management information server, the control module being configured to enable the management information file identified by the management information file identification to be retrieved from its current location provided by the management information server.

3. A management information loader as defined in claim 1 in which the management information file identified by the management information file identification is stored in a storage location provided by at least one device, the control module being configured to enable the management information file identified by the management information file identification to be retrieved from its current location provided by the device.

4. A management information loader as defined in claim 1 in which the operator interface module is configured to receive identifications of management information files entered by the operator through an operator input device.

5. A management information loader as defined in claim 1 in which the operator interface module is configured to display a filename for at least one management information file to the operator to enable the operator to select the filename, the operator interface module being configured to provide the selected filename to the control module as the management information file identification.

6. A management information loader as defined in claim 1 in which the management information files can have one of a predetermined set of formats, the management information loader including respective compilers for at least some of said formats in the predetermined set.

7. A management information loader as defined in claim 6 in which one of said formats in said predetermined set is the common format, the management information loader not including a compiler for the common format.

8. A method for loading management information for use in connection with a management information server, the management information server using management information in connection with performing at least one management operation in connection with a network, the network comprising a plurality of interconnected devices, said method comprising:

A. identifying at least one management information file containing management information to be used by the management information server;

B. compiling the at least one management information file to convert the at least one file from a current format to a common format; and C. configuring a control module to retrieve the identified management information file from a current location, enable a compiler to facilitate any necessary conversion of the retrieved management information file, and facilitate the loading of management information from the management information file into a working memory in the management information server.

9. A method as defined in claim 8 in which the identified management information file is stored in a storage location provided by the management information server and wherein the control module is configured to enable the identified management information file to be retrieved from a location provided by the management information server.

10. A method as defined in claim 8 in which the identified management information file is stored in a storage location provided by at least one device, and wherein the control module is configured to enable the management information file to be retrieved from a location provided by the device.

11. A method as defined in claim 8 further comprising providing an operator interface module, and wherein the operator interface module is configured to receive identifications of management information files entered by an operator through an operator input device.

12. A method as defined in claim 8 further comprising providing an operator interface module configured to display a filename for at least one management information file to an operator to enable the operator to select the filename and provide the selected filename to the control module.

13. A method as defined in claim 8 in which the management information files can have one of a predetermined set of formats, and wherein compiling includes providing respective compilers for at least some of said formats in the predetermined set.

14. A method as defined in claim 13 in which said predetermined set of formats includes a common format.

15. A computer program product for use in connection with a computer to provide a management information loader for use in connection with a management information server, the management information server using management information in connection with performing at least one management operation in connection with a network, the network comprising a plurality of interconnected devices, said computer program product comprising a computer readable medium having encoded thereon:

A. an operator interface module configured to enable an operator to provide a management information file identification identifying at least one management information file containing management information to be used by the management information server;

B. providing at least one compiler configured to convert at least one file from a current format to a common format; and C. providing a control module configured to receive the management information file identification from the operator interface module, retrieve the management information file identified by the management information file identification from a current storage location, control enabling the at least one compiler to facilitate any necessary conversion of the retrieved management information from the current format to the common format, and load management information from the management information file in the common format into a working memory in the management information server.

16. A computer program product as defined in claim 15 in which the management information file identified by the management information file identification is stored in a storage location provided by the management information server, the control module being configured to enable the management information file identified by the management information file identification to be retrieved from its current location provided by the management information server.

17. A computer program product as defined in claim 15 in which the management information file identified by the management information file identification is stored in a storage location provided by at least one device, the control module being configured to enable the management information file identified by the management information file identification to be retrieved from its current location provided by the device.

18. A computer program product as defined in claim 15 in which the operator interface module is configured to receive identifications of management information files entered by the operator through an operator input device.

19. A computer program product as defined in claim 15 in which the operator interface module is configured to display a filename for at least one management information file to the operator to enable the operator to select the filename, the operator interface module being configured to provide the selected filename to the control module as the management information file identification.

20. A computer program product as defined in claim 15 in which the management information files can have one of a predetermined set of formats, the computer program product including respective compilers for at least some of said formats in the predetermined set.

21. A computer program product as defined in claim 20 in which one of said formats in said predetermined set is the common format, the computer program product not including a compiler for the common format.

* * * * *